(12) United States Patent
Dotzler (10) Patent No.: US 11,794,617 B2
(45) Date of Patent: Oct. 24, 2023

(54) SPRING ELEMENT AND VEHICLE SEAT HAVING A SPRING ELEMENT

(71) Applicant: GRAMMER AG, Ursensollen (DE)

(72) Inventor: Florian Dotzler, Hirschau (DE)

(73) Assignee: GRAMMER AG, Ursensollen (DE)

( * ) Notice: Subject to any disclaimer, the term of this patent is extended or adjusted under 35 U.S.C. 154(b) by 218 days.

(21) Appl. No.: 17/464,861

(22) Filed: Sep. 2, 2021

(65) Prior Publication Data

US 2022/0063461 A1 Mar. 3, 2022

(30) Foreign Application Priority Data

Sep. 3, 2020 (DE) .......................... 102020123061.3

(51) Int. Cl.
*B60N 2/00* (2006.01)
*B60N 2/50* (2006.01)
*B60N 2/16* (2006.01)
*B60N 2/54* (2006.01)

(52) U.S. Cl.
CPC ............. *B60N 2/505* (2013.01); *B60N 2/162* (2013.01); *B60N 2/502* (2013.01); *B60N 2/542* (2013.01)

(58) Field of Classification Search
None
See application file for complete search history.

(56) References Cited

U.S. PATENT DOCUMENTS

| | | | | |
|---|---|---|---|---|
| 4,350,317 A * | 9/1982 | Aondetto | ............... | B60N 2/508 248/588 |
| 4,382,573 A * | 5/1983 | Aondetto | ............. | B60N 2/0875 248/419 |
| 5,489,139 A | 2/1996 | McFarland | | |
| 5,794,911 A * | 8/1998 | Hill | ........................ | B60N 2/544 248/419 |
| 6,550,740 B1 * | 4/2003 | Burer | ..................... | B60N 2/502 248/370 |

(Continued)

FOREIGN PATENT DOCUMENTS

| DE | 102016112108 | 1/2018 |
|---|---|---|
| DE | 102017130450 | 6/2019 |

OTHER PUBLICATIONS

Official Action with Machine Translation for German Patent Application No. 102020123061.3, dated Apr. 20, 2021, 10 pages.

(Continued)

*Primary Examiner* — Steven M Marsh
(74) *Attorney, Agent, or Firm* — Sheridan Ross P.C.

(57) ABSTRACT

A vehicle seat having a lower part and an upper part displaceable relative to the lower part in a longitudinal direction, and a spring element for cushioning longitudinal horizontal movements of the upper part relative to the lower part. A scissors frame connects the lower part and the upper part so that they can move relative to one another. The spring element comprises a first holding arm connected to the upper part, and a second holding arm connected to the scissors frame. The first holding arm and the second holding arm are connected to one another by a first connecting element such that the first holding arm is displaced towards the second holding arm during a displacement of the upper part relative to the lower part. A resiliently deformable spring element part is deformed during a displacement of the first holding arm relative to the second holding arm.

8 Claims, 6 Drawing Sheets

(56) References Cited

U.S. PATENT DOCUMENTS

| | | | |
|---|---|---|---|
| 8,616,644 B2* | 12/2013 | Lorey | B60N 2/162 |
| | | | 297/344.14 |
| 2010/0066146 A1* | 3/2010 | Weber | B60N 2/162 |
| | | | 297/340 |
| 2020/0108750 A1* | 4/2020 | Dotzler | B60N 2/505 |

OTHER PUBLICATIONS

Extended Search Report with machine translation for European Patent Application No. 21192386.7, dated Feb. 8, 2022, 10 pages.

* cited by examiner

SPRING ELEMENT AND VEHICLE SEAT HAVING A SPRING ELEMENT

CROSS-REFERENCE TO RELATED APPLICATION

This application claims the benefit of German Patent Application No. 10 2020 123 061.3 filed Sep. 3, 2020, the entire contents of which are incorporated herein by reference in its entirety.

FIELD

The invention relates to a spring element and to a vehicle seat having this spring element. The vehicle seat comprises a lower part, an upper part, an upper part slide which is displaceable relative to the upper part, and the spring element for cushioning longitudinal horizontal movements of the upper part slide relative to the upper part, wherein a scissors frame is provided which connects the lower part and the upper part so that they can move relative to one another.

BACKGROUND

Vehicle seats of this type having spring elements for cushioning longitudinal horizontal movements are known from the prior art, complex and maintenance-intensive constructions being provided within the scissors frame arrangement and in the running rails thereof.

SUMMARY

It is therefore the object of the present application to specify a spring element and a vehicle seat having the spring element, which are arranged in such a way that a compactly constructed vehicle seat with good accessibility and a simple construction of the spring element is provided.

This object is achieved by a vehicle seat having the features of claim 1 and by a spring element having the features of claim 10. Advantageous configurations of the invention are disclosed in the dependent claims.

A core idea of the invention is to provide a vehicle seat having a lower part, an upper part which is displaceable relative to the lower part in a longitudinal direction, and a spring element for cushioning longitudinal horizontal movements of the upper part relative to the lower part, wherein a scissors frame is provided which connects the lower part and the upper part in a height direction so that they can move relative to one another, wherein the spring element comprises a first holding arm which is connected to the upper part, and a second holding arm which is connected to the scissors frame, the first holding arm and the second holding arm being connected to one another by means of a first connecting element in such a way that the first holding arm is displaced towards the second holding arm during a displacement of the upper part relative to the lower part, and a resiliently deformable spring element part being provided which is at least in operative contact with the first holding arm and the second holding arm and is deformed during a displacement of the first holding arm relative to the second holding arm.

Longitudinal horizontal movements of the upper part with respect to the lower part are to be understood as movements such that the upper part moves in a horizontal plane, seen in a longitudinal direction of the vehicle seat. In particular, this movement of the upper part can be forcibly guided relative to the lower part by means of corresponding structural features, such as guide rails or the like. In particular, the upper part can be displaced translationally in the direction of the longitudinal direction relative to the lower part. Longitudinal horizontal movements or movements of the upper part occur due to an external force, for example translational movements of the vehicle with the vehicle seat during abrupt acceleration processes or the like, which result in a corresponding application of force.

Due to the action of force or the application of force, the upper part is displaced relative to the lower part, which corresponds to the movement or the longitudinal horizontal movement.

Further preferably, the first holding arm is connected to the upper part so as to be rotatable, and the second holding arm is connected to the scissors frame so as to be rotatable.

The first connecting element is provided and designed to position the first holding arm with respect to the second holding arm and, if necessary, depending on the configuration, also to guide it during a movement of the holding arms relative to one another.

The resiliently deformable spring element part is to be understood as meaning that after deformation of the spring element part, if no further force is applied, is not returned to the original state thereof, i.e. to the undeformed state.

According to a particularly preferred embodiment, the resiliently deformable spring element part is designed as a rigid foam element, which means that the spring element part consists of a foam which opposes a relatively high resistance to deformation under pressure load. Base polymers include, inter alia, formaldehyde resins, polystyrene, polyurethanes and polyvinyl chloride. Characteristic properties of rigid foams are high insulation properties, good moisture resistance and high mechanical strength. Polyurethane is particularly preferred. Cellasto should be mentioned here as a well-known brand.

The hardness of the rigid foam influences the achievable spring travel and the spring rate of the spring element.

Since the rigid foam, due to its configuration, also has damping properties, the spring element as a whole is also suitable to a certain extent as a damping element. The spring element having a spring element part consisting of rigid foam is at the same time also a damping element.

According to a particularly preferred embodiment, it is provided that the first connecting element comprises a first connecting element part and a second connecting element part, wherein the first connecting element part and the second connecting element part are connected to the first holding arm so as to be rotatable about a first axis of rotation and connected to the second holding arm so as to be rotatable about a second axis of rotation, the first connecting element part and the second connecting element part being arranged spaced apart from one another in an extension direction of the first axis of rotation.

The connecting element parts can be designed, for example, as connecting rods, like connecting rods or similar. A design of this type with connecting element parts means that no additional sliding joints are required, which results in a reduction in friction and also prevents a possible stick-slip effect.

Particularly preferably, the first axis of rotation and the second axis of rotation are arranged parallel to one another, furthermore in particular arranged to run in a width direction.

Furthermore, the distance between the first axis of rotation and the second axis of rotation influences the achievable spring travel and also the spring rate of the spring element.

By means of a displacement of the upper part relative to the lower part, due to the arrangement of the spring element already described, the first holding arm is displaced towards the second holding arm, whereby the connecting element parts rotate about the first axis of rotation and the second axis of rotation, whereby the first axis of rotation and the second axis of rotation move relative to one another, seen in the longitudinal direction.

Particularly preferably, at least one further connecting element can also be provided in order to improve the guidance of the holding arms with respect to one another.

According to a preferred embodiment, it is therefore provided that a second connecting element is provided, the first connecting element comprising a first connecting element part and a second connecting element part, and the second connecting element having a third connecting element part and a fourth connecting element part, the first connecting element part and the second connecting element part being in each case connected to the first holding arm so as to be rotatable about a first axis of rotation and connected to the second holding arm so as to be rotatable about a second axis of rotation, and the third connecting element part and the fourth connecting element part being in each case connected to the first holding arm so as to be rotatable about a third axis of rotation and connected to the fourth holding arm so as to be rotatable about a fourth axis of rotation, the first connecting element part and the second connecting element part being arranged spaced apart from one another in an extension direction of the first axis of rotation and the third connecting element part and fourth connecting element part being arranged spaced apart from one another in an extension direction of the third axis of rotation.

The same can also apply to further connecting elements.

According to a further preferred embodiment, it is provided that the first holding arm has a first receiving region and the second holding arm has a second receiving region, the resiliently deformable spring element part having the first receiving region and the second receiving region at least being in operative contact.

The first receiving region and the second receiving region can be adapted to the shape of the spring element part, so that a good fit of the spring element part can be achieved.

It is also conceivable that the spring element part can be fixedly connected to the holding arms, for example glued, screwed or the like.

According to a further preferred embodiment, it is provided that the resiliently deformable spring element part is designed substantially to have a cuboid shape.

According to a further preferred embodiment, it is provided that the first axis of rotation is arranged above the second axis of rotation, seen in a height direction, and the resiliently deformable spring element part is arranged between the first connecting element part and the second connecting element part, seen in the extension direction of the first axis of rotation.

A corresponding arrangement also applies to the further connecting element parts, if provided.

According to a further preferred embodiment, it can be provided that the resiliently deformable spring element part has at least one depression and/or at least one continuous opening.

The depression and the opening are preferably arranged to run in the width direction.

The depressions and/or openings serve in particular as compensation regions during the deformation in the event of displacement or longitudinal horizontal movement, so that the service life can be further increased.

According to a further preferred embodiment, it is provided that the first holding arm and the second holding arm are designed to be substantially identical. This allows manufacturing costs and installation times to be reduced.

It is also conceivable that the connecting element parts are designed to be substantially identical.

Substantially, this means that, apart from tolerance deviations, the design is identical.

The underlying object is also achieved by a spring element comprising a first holding arm and a second holding arm, the first holding arm and the second holding arm being connected to one another by means of a first connecting element in such a way that the first holding arm is displaceable towards the second holding arm, a resiliently deformable spring element part being provided which is at least in operative contact with the first holding arm and the second holding arm and being deformed during a displacement of the first holding arm relative to the second holding arm.

The statements with regard to the vehicle seat having the spring element can also be applied to and implemented in the spring element per se, as long as a reference to the vehicle seat is not absolutely necessary.

The functional principle of the spring element is shown below.

In the event of a movement of the first holding arm and the second holding arm relative to one another, for example due to a movement of the upper part relative to the lower part, the resiliently deformable spring element part is deformed, in particular compressed. This creates a spring effect and, depending on the configuration of the spring element part, a damper effect, whereby a counterforce is produced by the spring element part. Through the connecting element and the respective arrangement of the holding arms, the movement is specifically directed and, together with the counterforce, a restoring torque is generated so that the spring element part and, accordingly, the spring element are again in their starting position or original state or normal state.

Furthermore, through the same configuration of the holding arms and the arrangement of the spring element part and the connecting element parts, it can be achieved that the spring rate in the longitudinal direction to the front and in the longitudinal direction to the rear are identical.

BRIEF DESCRIPTION OF THE DRAWINGS

Further advantageous embodiments result from the dependent claims.

Additional objects, advantages and expedient uses of the present invention can be found in the following description in conjunction with the drawings. In the drawings.

DETAILED DESCRIPTION

In the drawings, identical components are to be provided with corresponding reference signs in each case. For the sake of clarity, in some of the drawings, components that have been identified elsewhere may not be provided with a reference sign.

Figure 1A:
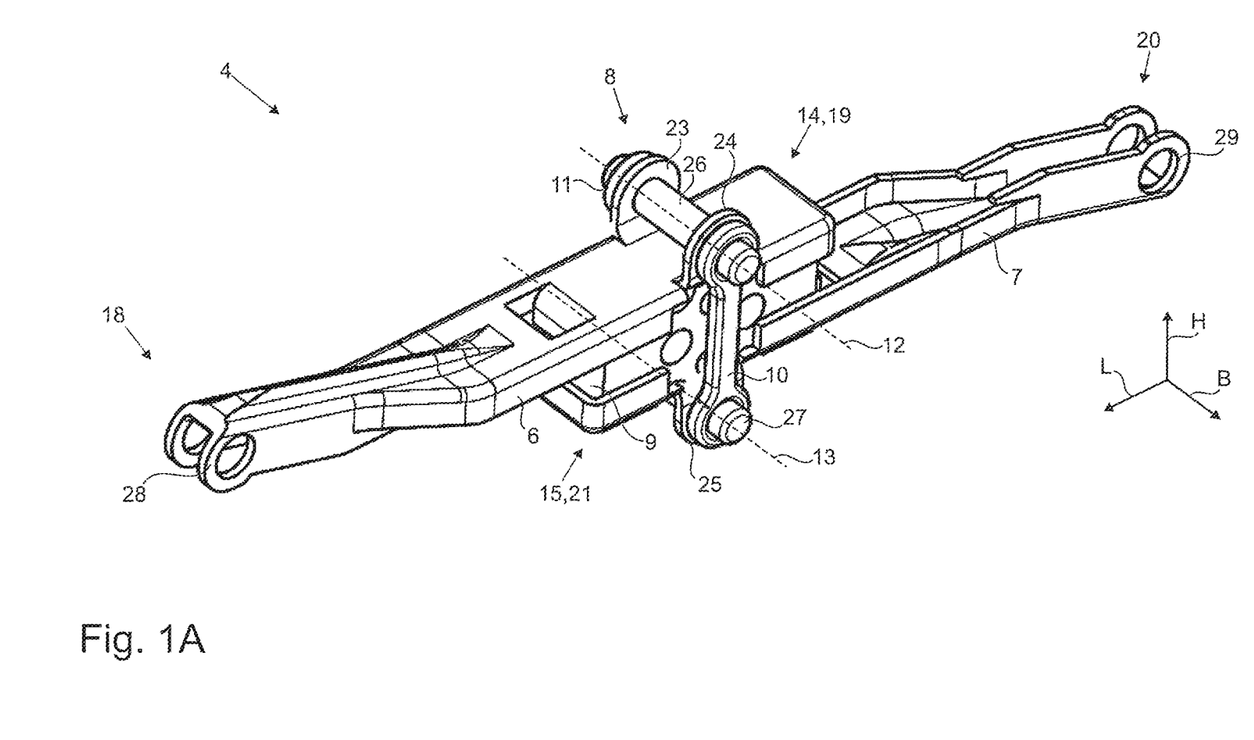
FIG. 1A shows a spring element according to a preferred embodiment.

In FIG. 1A, a spring element 4 is shown according to a preferred embodiment. The spring element 4 has a first holding arm 6 and a second holding arm 7, which in particular are designed to be identical.

The first holding arm 6 has a first end 18 and a second end 19, and the second holding arm 7 has a first end 20 and a second end 21.

The first ends 18, 20 are designed in each case as connecting regions 28, 29, a first connecting region 28 being assigned to the first end 18 of the first holding arm 6 and a second connecting region 29 being assigned to the first end 20 of the second holding arm 7. By means of the connecting regions 28, 29, it is possible to arrange and connect the spring element 4, for example, to components of a vehicle seat (not shown here). In particular, the connecting regions 28, 29 are provided and designed to be able to produce a rotary connection to the components. For example, it is conceivable that the connecting regions 28, 29 comprises through-openings 30 into which a shaft can be introduced. Each connecting region preferably has two opposite through-openings 30, seen in the width direction B.

The first holding arm 6 is particularly preferably connected to a first component (not shown here) so as to be rotatable about a third axis of rotation 36 and the second holding arm 7 is connected to a second component (not shown here) so as to be rotatable about a fourth axis of rotation 37. The components can, for example, be parts of a vehicle seat, as will be shown in the following drawings.

The second end 19 of the first holding arm 6 has a first receiving region 14 and the second end 21 of the second holding arm 7 has a second receiving region 15, the spring element part 9 being in operative contact with both the first receiving region 14 and the second receiving region 15. It is conceivable that either a force-fit connection is provided or a form-fit connection.

The second ends 19, 21 and correspondingly the holding arms 6, 7 are connected to one another by means of a first connecting element 8, the first connecting element 8 comprising a first connecting element part 10 and a second connecting element part 11.

The first connecting element part 10 and the second connecting element part 11 are arranged spaced apart from one another, seen in the width direction B. A first end 31 of the first connecting element part 10 and a first end 32 of the second connecting element part 11 are connected to the first holding arm 6 so as to be rotatable about a first axis of rotation 12, and a second end 33 of the first connecting element part 10 and a second end 34 of the second connecting element part 11 are connected to the second holding arm 7 so as to be rotatable about a second axis of rotation 13. A first receptacle 22 and a second receptacle 23 are preferably provided on the first holding arm 6, which are spaced apart from one another in the width direction B and have through-openings in which a first shaft 26, which defines the first axis of rotation 12, is introduced. More preferably, a third receptacle 24 and a fourth receptacle 25 are provided on the second holding arm 6, which are spaced apart from one another in the width direction B and have through-openings in which a second shaft 27, which defines the second axis of rotation 13, is introduced.

The first axis of rotation 12 is arranged above the second axis of rotation 13, seen in the height direction H. The axis of rotation 12, 13 are particularly preferably arranged parallel to one another and extending in the width direction B.

Furthermore, the spring element part 9 is preferably arranged on the one hand between the holding arms 6, 7 and on the other hand between the connecting element parts 10, 11.

Figure 1B:
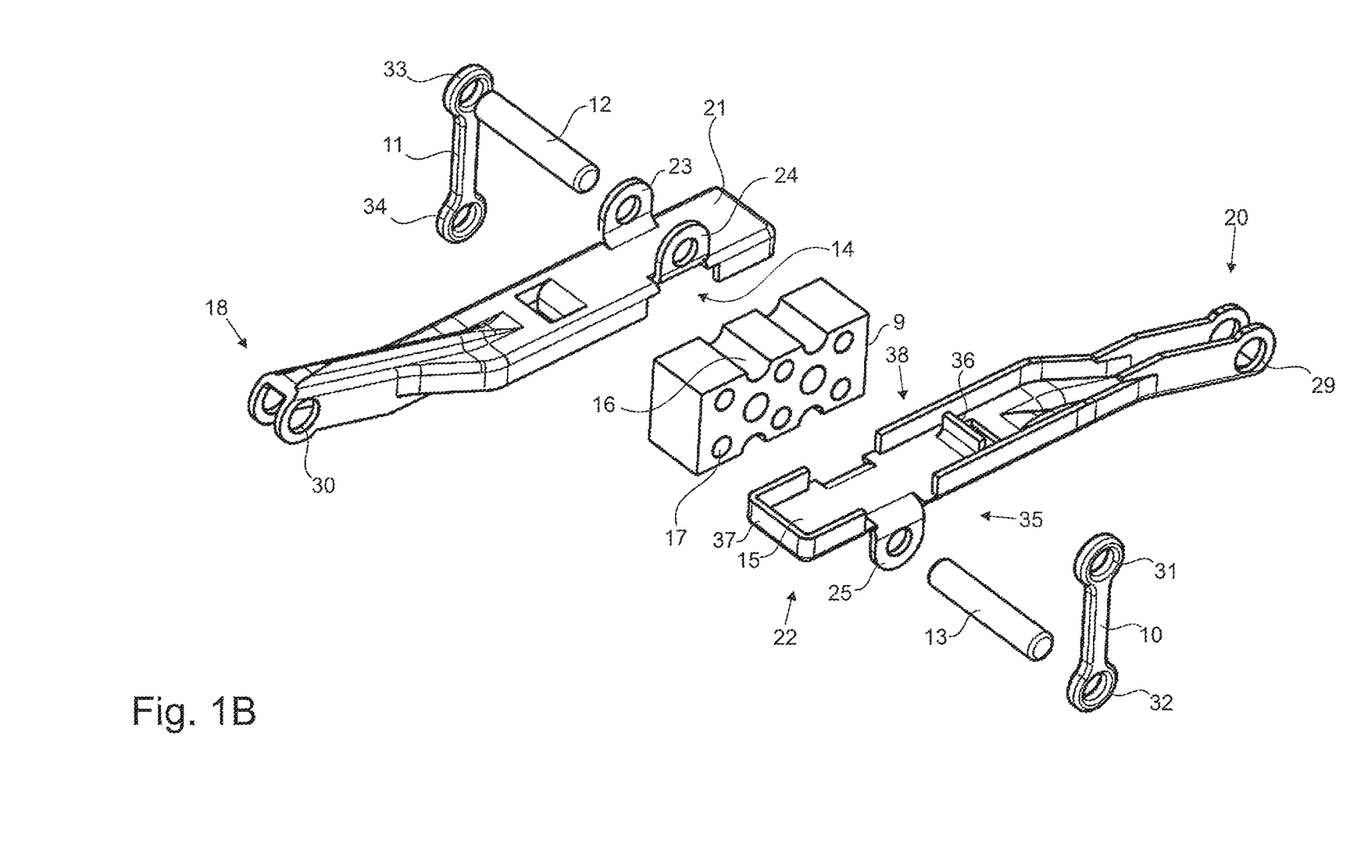
FIG. 1B is an exploded view of a spring element according to FIG. 1A.

In FIG. 1B, the spring element 4 of FIG. 1A is shown again in an exploded view. In this case, the configuration of the receiving regions 14, 15 will be discussed in more detail. The shape of the receiving region 14, 15 is particularly preferably adapted to the shape of the spring element part 9; in this case, the spring element part 9 is designed to have a cuboid shape, although other shapes are also possible in principle.

In order to be able to fix the spring element part 9 in one position, for example during installation, it is provided that a delimitation 35 is provided having a first delimitation part 36 and a second delimitation part 37, which are spaced apart from one another in the longitudinal direction L and extend in the height direction H and width direction B. Lateral delimitation parts 38 can also be provided, which likewise extend in the height direction H and in the longitudinal direction L.

Particularly preferably, the spring element part 9 has at least one depression 16 and at least one continuous opening 17, both of which are provided to be able to relieve the structure of the spring element part 9 in the event of a deformation.

The depression or depressions 16 are arranged on a surface of the spring element part 9.

Figure 2A:
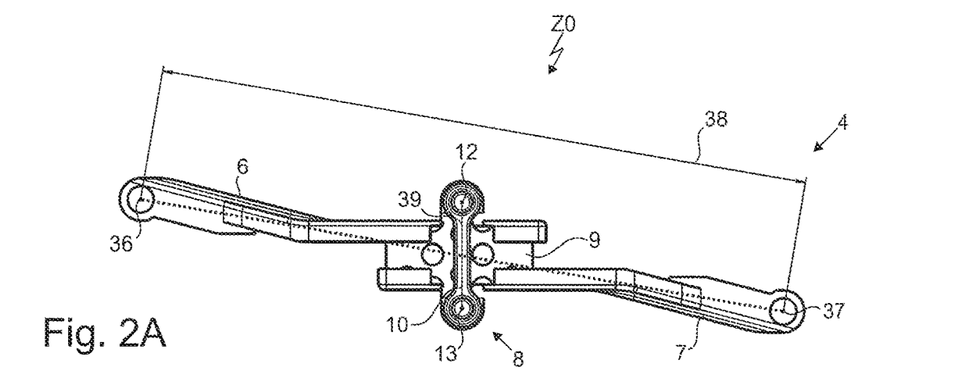
FIG. 2A is a side view of the spring element according to FIG. 1A in a normal state.

FIG. 2A shows the spring element 4 according to FIG. 1A in a side view and in a normal state ZO or original state, i.e. in a state in which the spring element part 9 is not deformed.

A first distance 38 from the third axis of rotation 36 to the fourth axis of rotation 37 defines an initial length of the spring element 4, and a second distance 39 is provided between the first axis of rotation 12 and the second axis of rotation 13. The second distance 39 determines in particular the achievable spring travel of the spring element 4, and also the spring rate of the spring element 4.

Particularly preferably, the spring element part 9 and the first connecting element part 10 or the second connecting element part 11 are arranged in such a way that a connecting line between the first axis of rotation 12 and the second axis of rotation 13 is arranged in the middle of the spring element part 9 in the normal state Z0.

Figure 2B:
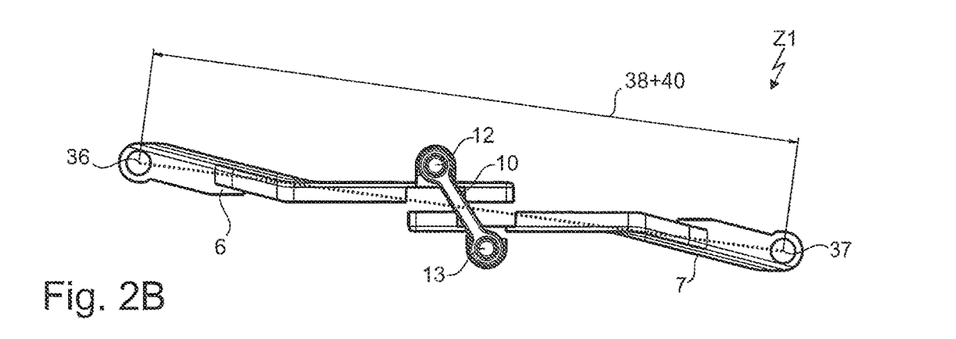
FIG. 2B is a side view of the spring element according to FIG. 1A in a first deformed state.
Figure 2C:
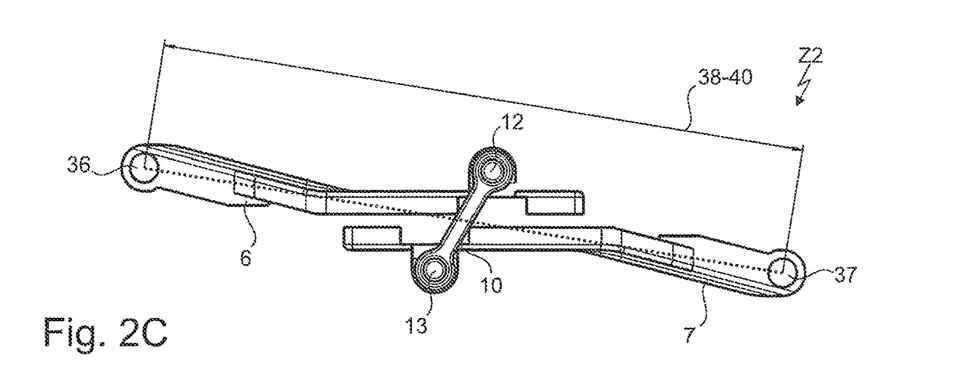
FIG. 2C is a side view of the spring element according to FIG. 1A in a second deformed state.

FIG. 2B shows the spring element 4 in a first deformed state Z1 and FIG. 2C shows the spring element 4 in a second deformed state Z2.

The states Z1, Z2 differ in the direction of the displacement of the first holding arm 6 towards the second holding arm 7. By connecting the holding arms 6, 7 by means of the connecting element parts 10, 11 and possibly further connecting element parts, the connecting element part 10, 11 is rotated about the first axis of rotation 12 and also the second axis of rotation 13. Correspondingly, the first distance 38 changes to a length from the first distance 38 plus or minus a spring travel 40, depending on the direction, namely by a resulting amount due to the movement of the connecting element parts 10, 11 and the resulting displacement of the holding arms 6, 7 relative to one another.

Figure 2D:
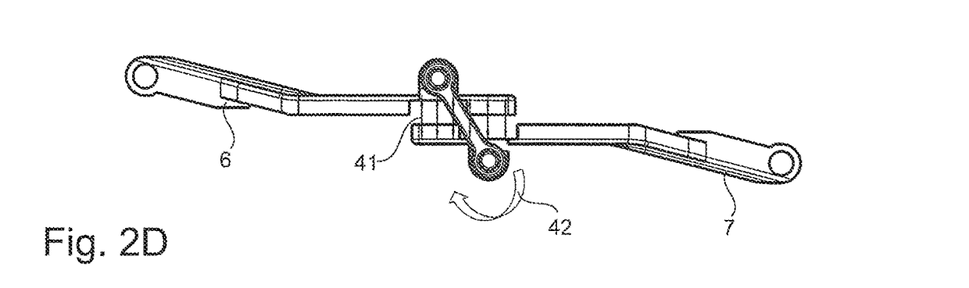
FIG. 2D shows the operating principle of the spring element according to FIG. 1A.

FIG. 2D also shows how a restoring force is generated by means of the spring element part 9.

In the event of a movement of the first holding arm 6 and the second holding arm 7 relative to one another, for example due to a movement of an upper part relative to a lower part of a vehicle seat, the resiliently deformable spring element part 9 is deformed, in particular compressed. This creates a spring effect and, depending on the configuration of the spring element part 9, a damper effect, a counterforce 41 being produced by the spring element part 9 as a result of the spring effect. Through the connecting element 8 and the respective arrangement of the holding arms 6, 7, the movement is specifically directed and, together with the counterforce, a restoring torque 42 is generated so that the spring element part 9 and, accordingly, the spring element 4 are again in their starting position or original state or normal state Z0.

Figure 3A:
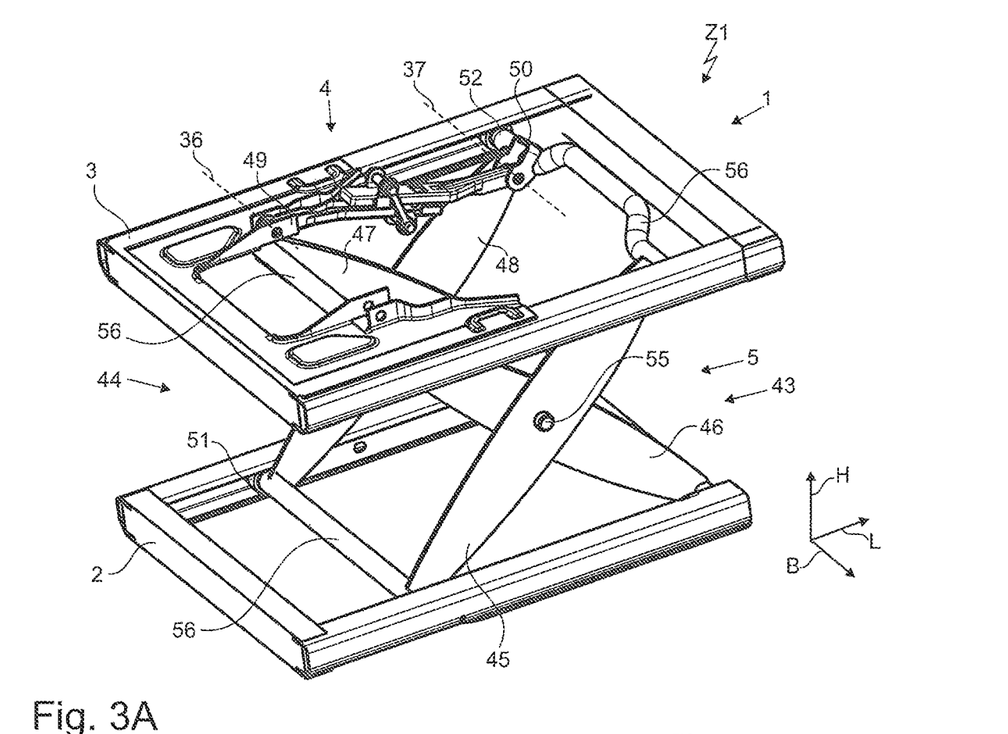
FIG. 3A is a perspective view of the vehicle seat having the spring element in a first deformed state.
Figure 3B:
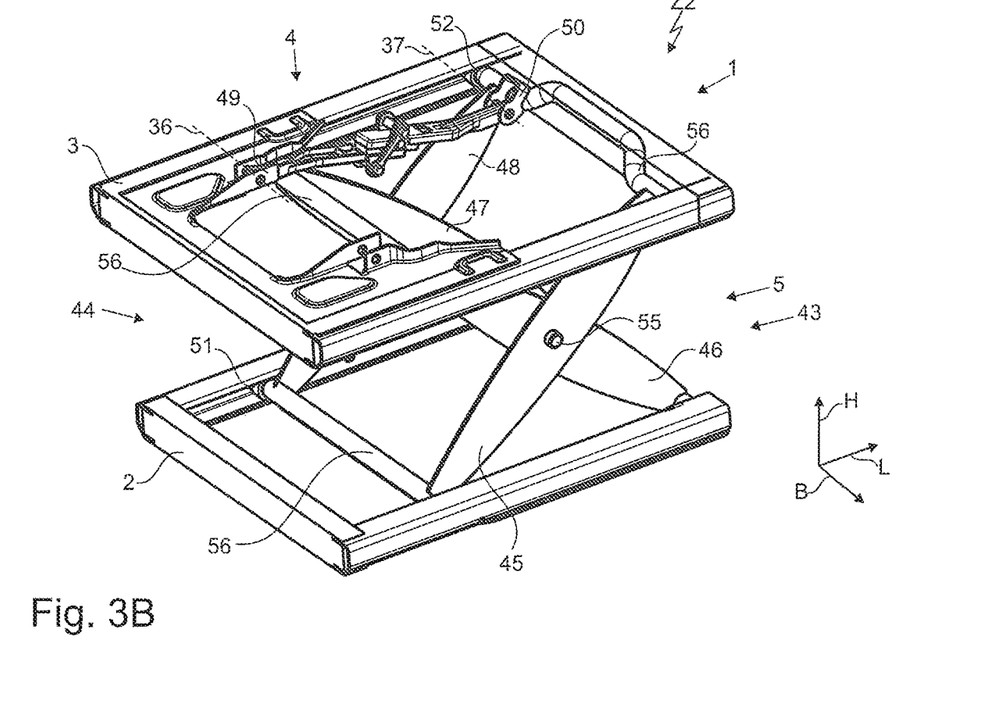
FIG. 3B is a perspective view of the vehicle seat having the spring element in a second deformed state.
Figure 3C:
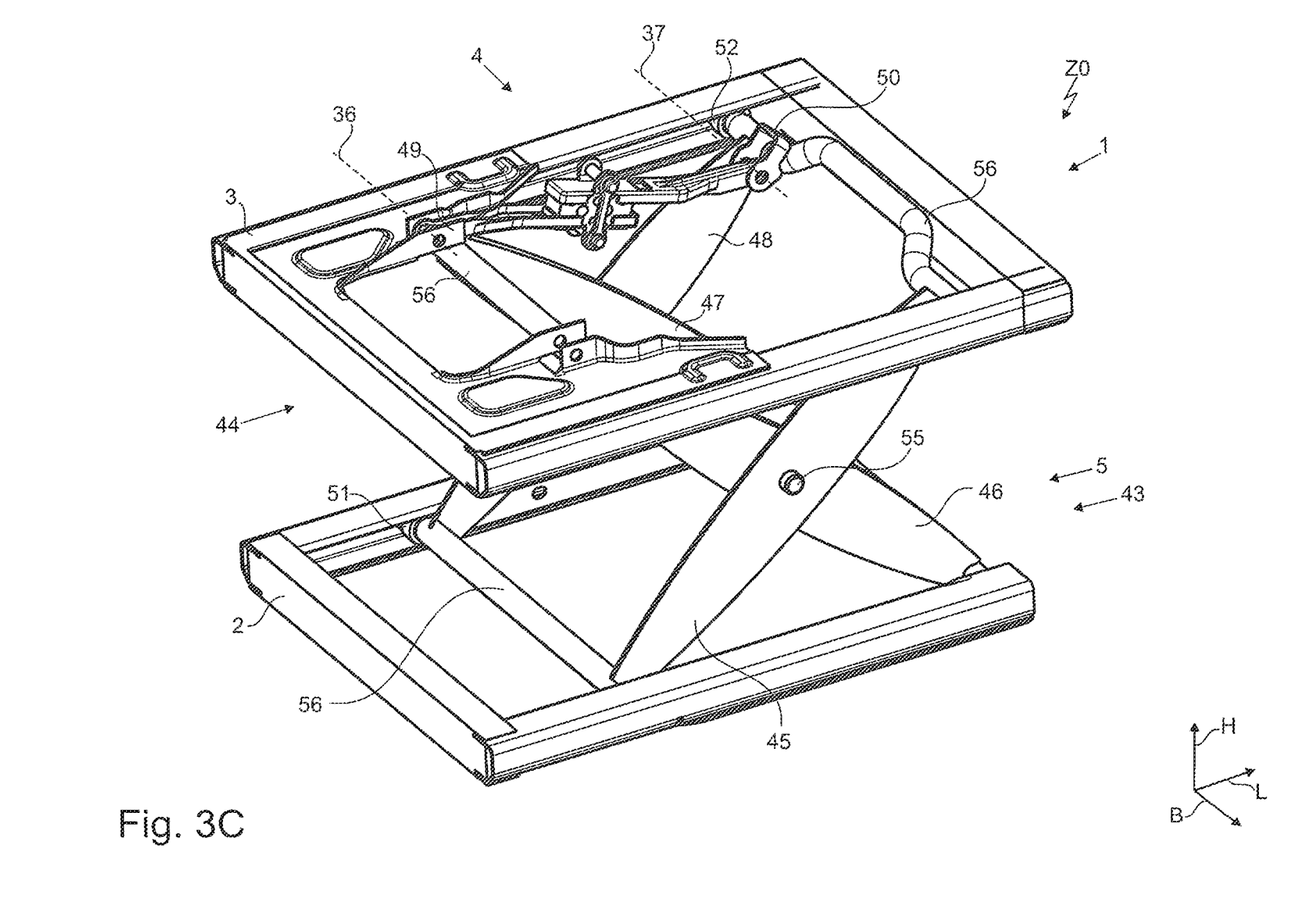
FIG. 3C is a perspective view of the vehicle seat having the spring element in a normal state.

In FIG. 3A, 3B and 3C, a vehicle seat 1 is shown which has the spring element 4 in order to cushion movements, in this case an upper part 3 of the vehicle seat 1 relative to a lower part 2. In FIG. 3A, the vehicle seat 1 is shown in state Z1, in FIG. 3B in state Z2 and in FIG. 3C in state Z0.

Furthermore, a scissors frame 5 is provided which connects the lower part 2 and the upper part 3 in a height direction H so that they can move relative to one another.

The spring element 4 is connected to the upper part 3 so as to be rotatable about the third axis of rotation 36 and connected to the scissors frame 5 so as to be rotatable about the fourth axis of rotation 37.

The scissors frame preferably has a first pair of scissors 43 and a second pair of scissors 44 spaced apart in the width direction B, the pairs of scissors 43, 44 each having a first swing arm 45, 47 and a second swing arm 46, 48.

The spring element 4 is particularly preferably connected to a first swing arm 45, 47 or to a second swing arm 46, 48 so as to be rotatable. More preferably, first and second receiving elements 49, 50 corresponding to the holding arms 6, 7 are provided, which are designed and provided to connect the holding arms 6, 7 to the upper part 3 and the scissors frame 5.

Furthermore, the following arrangement of the swing arms 45, 46, 47, 48 is conceivable: the first swing arms 45, 47 are each connected to the lower part 2 by means of a first floating bearing 51, the first swing arms 45, 47, on the other hand, each being connected to the upper part 3 by means of a second floating bearing 52. The second swing arms 46, 48 are each connected to the upper part 3 by means of a third floating bearing 53, the second swing arms 46, 48, on the other hand, each being connected to the lower part 2 by means of a fixed bearing 54.

Furthermore, the first swing arms 45, 47 and the second swing arms 46, 48 are connected by means of a common axis of rotation 55 so as to be rotatable.

The spring element 4 in the vehicle seat 1 is designed as a longitudinal horizontal spring element, which means that it is provided to cushion and, if necessary, to dampen movements in the longitudinal horizontal direction of the upper part 3 with respect to the lower part 2.

It is also conceivable that a connecting pipe 56 is provided between identically arranged floating bearings of different pairs of scissors for further stabilisation. Each connecting pipe 56 extends in the width direction B and can be designed to be straight or to have any other shape.

Figure 4A:
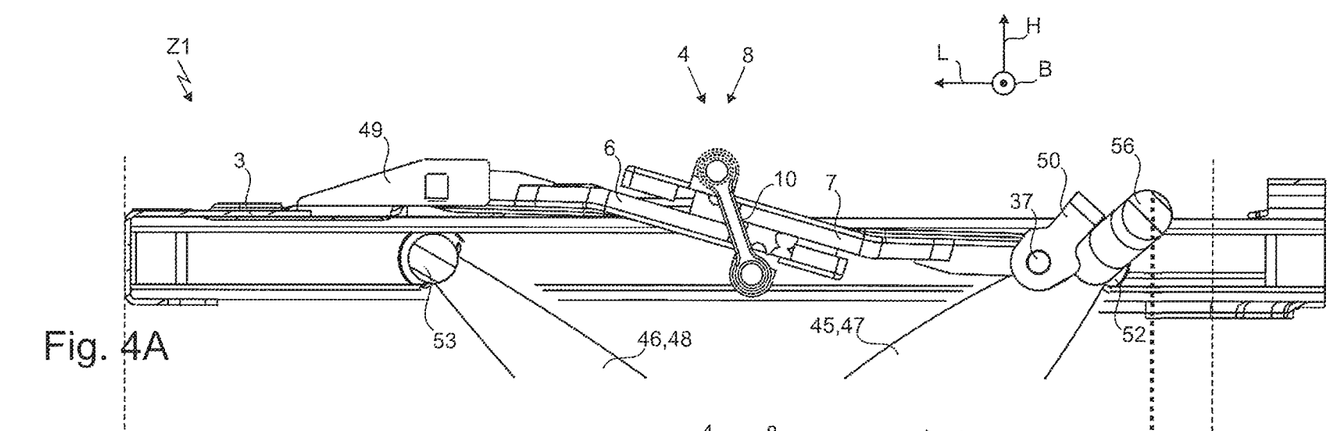
FIG. 4A is a sectional view of the vehicle seat having the spring element in a first deformed state.
Figure 4B:
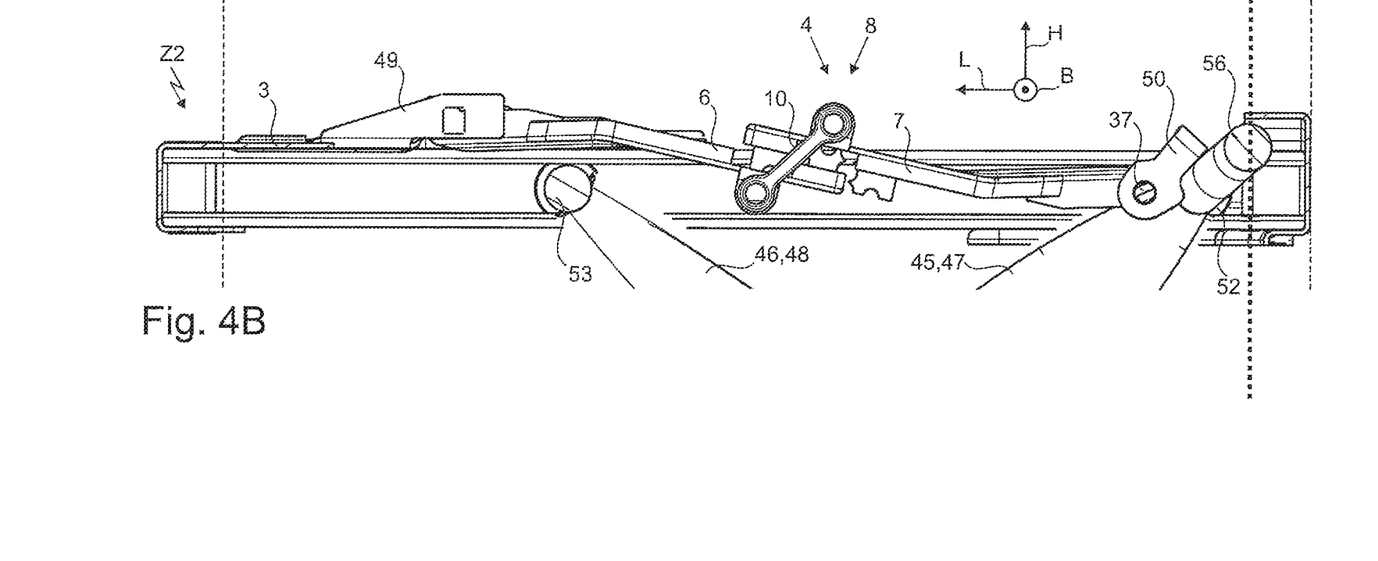
FIG. 4B is a sectional view of the vehicle seat having the spring element in a first deformed state.

In FIG. 4A and 4B, details can be seen in a section of FIG. 3A and 3B, which are arranged in a direct comparison with one another.

A comparison of FIG. 4A and 4B relatively shows the position between the states Z1 and Z2, whereby the longitudinal horizontal movement of the upper part 3 is easy to understand. The positions of the spring element 4 and in particular of the holding arms 6, 7 and the connecting element 8 can also be seen.

All features disclosed in the application documents are claimed as being substantial to the invention, provided that they are, individually or in combination, novel over the prior art.

LIST OF REFERENCE SIGNS

1 Vehicle seat
2 Lower part
3 Upper part
4 Spring element
5 Scissors frame
6 First holding arm
7 Second holding arm
8 First connecting element
9 Spring element part
10 First connecting element part
11 Second connecting element part
12 First axis of rotation
13 Second axis of rotation
14 First receiving region
15 Second receiving region
16 Depression
17 Through-opening
18 First end of first holding arm
18 Second end of the first holding arm
20 First end of the second holding arm
21 Second end of the second holding arm
22 First receptacle
23 Second receptacle
24 Third receptacle
25 Fourth receptacle
26 First shaft
27 Second shaft
28 First connecting region
29 Second connecting region
30 Through-opening
31 First end of the first connecting element part
32 Second end of the first connecting element part
33 First end of the second connecting element part
34 Second end of the second connecting element part
36 Third axis of rotation
37 Fourth axis of rotation
38 First distance
39 Second distance
40 Spring travel
41 Counterforce
42 Restoring torque
43 First pair of scissors
44 Second pair of scissors
45 First swing arm of the first pair of scissors
46 Second swing arm of the first pair of scissors
47 First swing arm of the second pair of scissors
48 Second swing arm of the second pair of scissors
49 Receiving element
50 Receiving element 51 First floating bearing
52 Second floating bearing
53 Third floating bearing
54 Fixed bearing
55 Common axis of rotation
56 Connecting pipe
L Longitudinal direction
B Width direction
H Height direction

What is claimed is:

1. A vehicle seat comprising:
a lower part;
an upper part that is displaceable relative to the lower part in a longitudinal direction; and
a spring element for cushioning longitudinal horizontal movements of the upper part relative to the lower part, wherein a scissors frame is provided that connects the lower part and the upper part in a height direction so that they can move relative to one another,
wherein the spring element includes:
a first holding arm that is connected to the upper part;
a second holding arm that is connected to the scissors frame, the first holding arm and the second holding arm being connected to one another by means of a first connecting element, in such a way that the first holding arm is displaced towards the second holding arm during a displacement of the upper part relative to the lower part; and
a resiliently deformable spring element part that is at least in operative contact with the first holding arm and the second holding arm and is deformed during a displacement of the first holding arm relative to the second holding arm, wherein the first connecting element comprises a first connecting element part and a second connecting element part, the first connecting element part and the second connecting element part being connected to the first holding arm so as to be rotatable about a first axis of rotation and connected to the second holding arm so as to be rotatable about a second axis of rotation, the first connecting element part and the second connecting element part being arranged spaced apart from one another in an extension direction of the first axis of rotation.

2. The vehicle seat according to claim 1, wherein the first holding arm has a first receiving region and the second holding arm has a second receiving region, the resiliently deformable spring element part having the first receiving region and the second receiving region at least being in operative contact.

3. The vehicle seat according to claim 1, wherein the first axis of rotation is arranged above the second axis of rotation, seen in a height direction, and preferably the resiliently deformable spring element part is arranged between the first connecting element part and the second connecting element part, seen in the extension direction of the first axis of rotation.

4. The vehicle seat according to claim 1, wherein the resiliently deformable spring element part consists at least partially of polyurethane.

5. The vehicle seat according to claim 1, wherein the resiliently deformable spring element part is designed substantially to have a cuboid shape.

6. The vehicle seat according to claim 1, wherein the resiliently deformable spring element part has at least one of a depression or at least one continuous opening.

7. A vehicle seat, comprising:
a lower part;
an upper part that is displaceable relative to the lower part in a longitudinal direction; and
a spring element for cushioning longitudinal horizontal movements of the upper part relative to the lower part, wherein a scissors frame is provided that connects the lower part and the upper part in a height direction so that they can move relative to one another,
wherein the spring element includes:
a first holding arm that is connected to the upper part;
a second holding arm that is connected to the scissors frame, the first holding arm and the second holding arm being connected to one another by means of a first connecting element, in such a way that the first holding arm is displaced towards the second holding arm during a displacement of the upper part relative to the lower part; and
a resiliently deformable spring element part that is at least in operative contact with the first holding arm and the second holding arm and is deformed during a displacement of the first holding arm relative to the second holding arm, wherein a second connecting element is provided, the first connecting element comprising a first connecting element part and a second connecting element part, and the second connecting element having a third connecting element part and a fourth connecting element part, the first connecting element part and the second connecting element part being connected to the first holding arm so as to be rotatable about a first axis of rotation and connected to the second holding arm so as to be rotatable about a second axis of rotation, and the third connecting element part and the fourth connecting element part are in each case connected to the first holding arm so as to be rotatable about a third axis of rotation, and connected to the second holding arm so as to be rotatable about a fourth axis of rotation, the first connecting element part and the second connecting element part being arranged spaced apart from one another in an extension direction of the first axis of rotation and the third connecting element part and fourth connecting element part being arranged spaced apart from one another in an extension direction of the third axis of rotation.

8. The vehicle seat according to claim 1, wherein the first holding arm and the second holding arm are designed to be substantially identical.

* * * * *